United States Patent [19]

Flegel

[11] Patent Number: 5,895,981
[45] Date of Patent: Apr. 20, 1999

[54] GENERATOR TRANSFER PANEL WITH A TERMINAL ARRANGEMENT FOR ESTABLISHING A DIRECT CONNECTION TO A REMOTE POWER INLET

[75] Inventor: David D. Flegel, Racine, Wis.

[73] Assignee: Reliance Time Control, Inc., Racine, Wis.

[21] Appl. No.: 09/021,670

[22] Filed: Feb. 10, 1998

[51] Int. Cl.$^6$ ........................................... H02J 7/00
[52] U.S. Cl. ................................................ 307/64
[58] Field of Search ........................... 361/641, 644, 361/600; 174/50; 220/3.3; 307/64

[56] References Cited

U.S. PATENT DOCUMENTS

| | | |
|---|---|---|
| 352,316 | 8/1970 | Daly . |
| 3,277,251 | 10/1966 | Daly . |
| 3,284,591 | 11/1966 | Daly . |
| 3,361,938 | 1/1968 | Watson . |
| 3,391,374 | 7/1968 | Schleicher . |
| 3,559,148 | 1/1971 | Hafer . |
| 3,636,237 | 1/1972 | Hafer . |
| 3,654,484 | 4/1972 | Jorgenson et al. . |
| 3,716,683 | 2/1973 | Hafer . |
| 3,723,256 | 5/1973 | Dennison . |
| 3,731,256 | 5/1973 | Hafer . |
| 3,739,321 | 6/1973 | Murphy et al. . |
| 3,742,431 | 6/1973 | Kobyner . |
| 3,781,765 | 12/1973 | Schleicher . |
| 3,895,179 | 7/1975 | Wyatt .................... 174/50 |
| 3,922,053 | 11/1975 | Hafer . |
| 4,067,529 | 1/1978 | Milcoy . |
| 4,088,829 | 5/1978 | Milcoy . |
| 5,070,252 | 12/1991 | Castenschiold et al. . |
| 5,268,850 | 12/1993 | Skoglund . |
| 5,761,027 | 6/1998 | Flegel ..................... 361/664 |

Primary Examiner—Shawn Riley
Attorney, Agent, or Firm—Andrus, Sceales, Starke & Sawall

[57] ABSTRACT

A power transfer switching mechanism for interposition between a remote power inlet box and the electrical load center of a building includes a terminal compartment for receiving power input wires connected to the remote power inlet box. The switching mechanism includes a cabinet defining an internal cavity within which a series of switches are mounted. The cabinet further defines a terminal compartment, and a terminal assembly is disposed within the terminal compartment. The terminal compartment is accessible through an opening associated with the cabinet, and a cover is selectively positionable over the opening to provide or prevent access to the terminal compartment. A series of wires are interconnected between the terminal assembly and the switches, and power input wiring is received within the terminal compartment and interconnected with the remote power inlet box. The ends of the power input wires are engageable with the terminal assembly for establishing a direct electrical connection between the remote power inlet box and the switches of the switching mechanism.

19 Claims, 2 Drawing Sheets

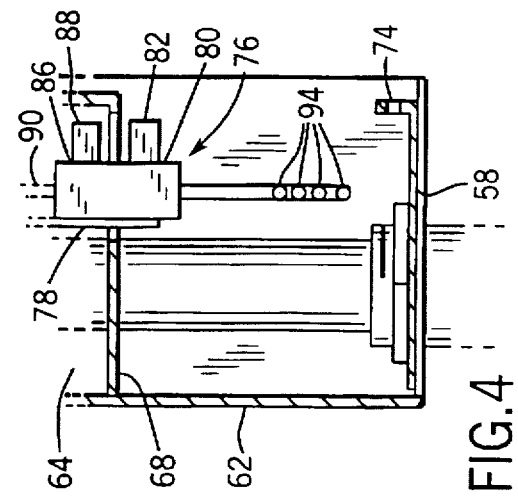
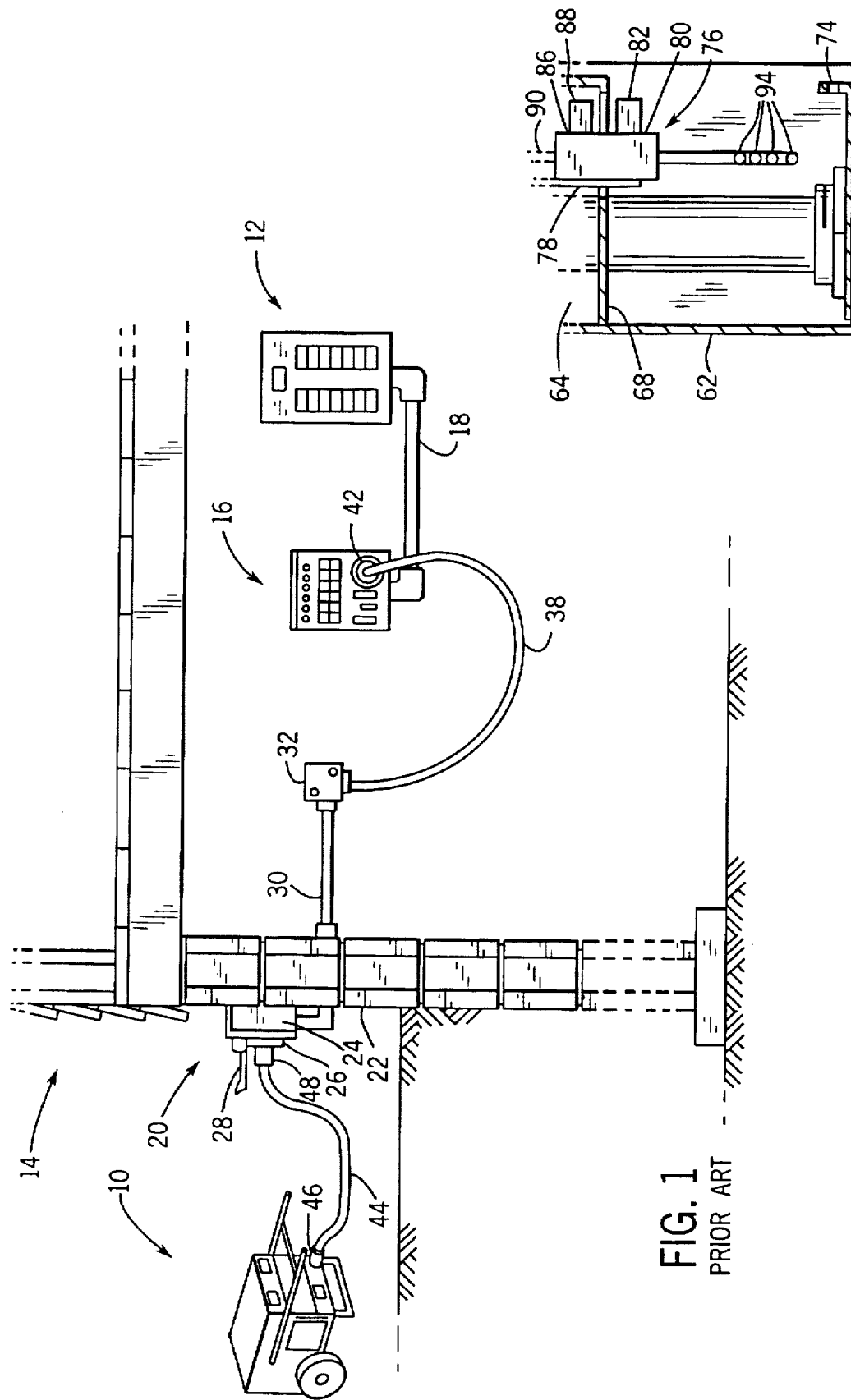
FIG. 4
FIG. 1
PRIOR ART

5,895,981

GENERATOR TRANSFER PANEL WITH A TERMINAL ARRANGEMENT FOR ESTABLISHING A DIRECT CONNECTION TO A REMOTE POWER INLET

BACKGROUND AND SUMMARY OF THE INVENTION

This invention relates to a power inlet arrangement for providing power to the electric system of a building, such as power supplied from a standby generator.

Portable generators may be used in certain situations to feed electrical power to residential and commercial load circuits during a utility power outage. These systems frequently include a power inlet box adapted for interconnection with the generator. The power inlet box is typically mounted to the exterior of a building. The power inlet box is connected to a transfer switching mechanism which continues the electrical path through circuit breakers associated with the transfer switching mechanism, to supply power to certain selected circuits of the load center as determined by the transfer switching mechanism circuit breakers. The circuits of the transfer switching mechanism are wired to selected circuits of the load center, through wiring housed within a conduit extending between the load center and the transfer switching mechanism.

The transfer switching mechanism includes a power input receptacle in its front face. Typically, the remote power inlet box is wired to a power cord connected to a junction box, which is engageable with the power input receptacle of the transfer switching mechanism.

It is an object of the present invention to provide a transfer switching mechanism which eliminates the need for a cord for providing input power to the transfer switching mechanism from a generator or power inlet interconnected with a generator. It is a further object of the invention to provide such a transfer switching mechanism which ensures that a reliable connection is established with the generator when power is supplied to the transfer switching mechanism. Yet another object of the invention is to provide such a transfer switching mechanism which is simple to install and which operates generally similarly to prior art transfer switching mechanisms.

In accordance with one aspect of the invention, a power transfer arrangement for supplying power from a generator to the electrical system of a building includes a power inlet arrangement for providing input power from a generator, in combination with a power transfer device separate from the power inlet arrangement and adapted for interconnection with the building electrical system. The power transfer device includes a power input terminal arrangement, and a direct electrical connection extends between and electrically connects the power inlet arrangement with the input terminal arrangement for providing a hardwired electrical connection between the power inlet arrangement and the power transfer device. The power transfer device preferably includes a cabinet, and the power input terminal arrangement is mounted within a power input terminal compartment defined by the cabinet. The power transfer device further includes a series of switches or circuit breakers for controlling the supply of power from the power transfer device to the building electrical system, and the series of switches are wired to the power input terminal arrangement. In one form, the power inlet arrangement is in the form of a remote power inlet box having a connector for receiving a plug to provide power to the power inlet box from the generator. The direct electrical connection between the power inlet arrangement and the power transfer device includes a set of power input wires, each of which has a first end connected to the remote power inlet box and a second end connected to the power input terminal arrangement. The set of power input wires preferably extend through a conduit having an end fixed to the cabinet such that a passage defined by the conduit, through which the power input wires extend, is in communication with the power input terminal compartment. The cabinet defines an opening providing access to the power input terminal compartment. A removable cover is positionable over the opening and removably engageable with the cabinet for selectively preventing access to the power input terminal compartment.

The invention further contemplates an improvement in a standby power supply system for connecting a generator to a power transfer device interconnected with the electrical system of a building, in combination with a power inlet remote from the power transfer device for connection to the generator to receive power from the generator. The improvement is in the form of a set of power input terminals provided on the power transfer device for establishing a direct electrical connection between the power inlet and the power transfer device. Details of the improvement according to this aspect of the invention are substantially in accordance with the foregoing summary.

Another aspect of the invention involves a power transfer device for interconnection with the electric system of a building including a cabinet, a set of switches or circuit breakers mounted to the cabinet, and a first set of wires for connecting the switches to an electrical distribution panel associated with the building electrical system. This aspect of the invention contemplates a terminal compartment associated with the cabinet and a set of power input terminals located within the terminal compartment. The power input terminals are electrically connected to the switches by a second set of wires. A set of power input wires extend into the terminal compartment and are adapted for a hardwired connection to the terminals for supplying power to the power transfer device. The power input wires preferably are interconnected with a remote power inlet box which is adapted for connection to the generator, such that power is supplied from the generator to the power inlet box and through the power input wires to the power input terminals.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a schematic representation showing a prior art power inlet arrangement for interconnecting a portable power generator with an electrical panel associated with a building;

FIG. 4 is a partial section view taken along line 4—4 of FIG. 3.

DETAILED DESCRIPTION OF THE INVENTION

Figure 2:
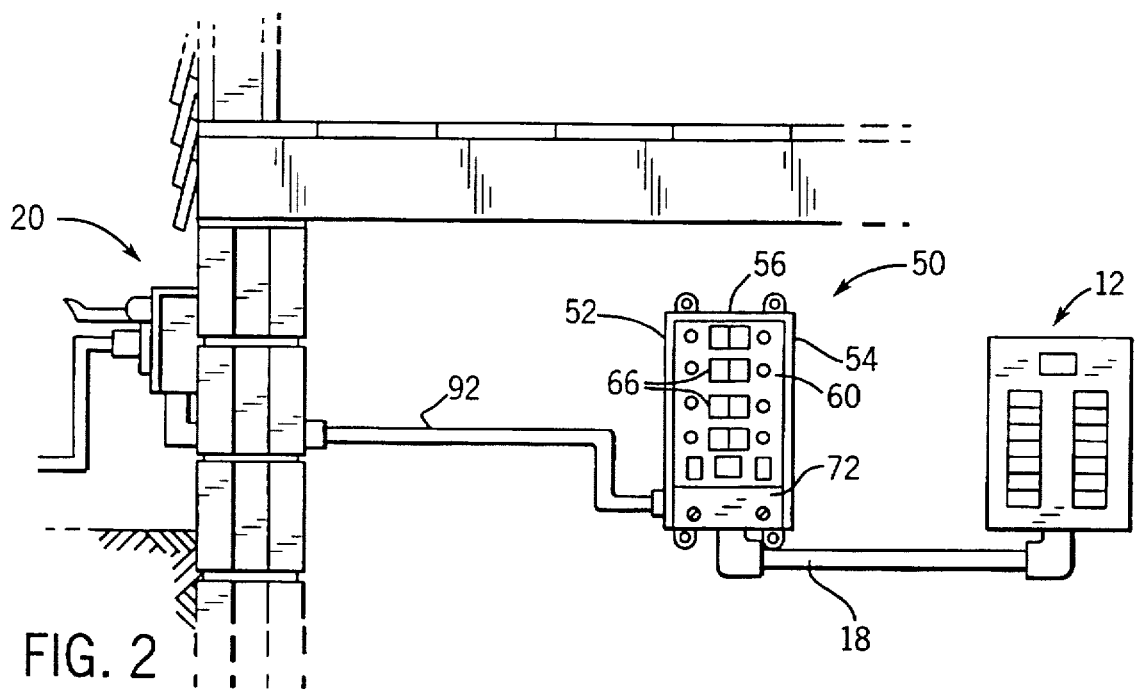
FIG. 2 is a schematic representation similar to FIG. 1, showing the power transfer arrangement constructed according to the invention, for interposition between a remote power inlet and the electrical panel.

FIG. 1 shows a prior art power inlet arrangement for interconnecting a portable generator 10 with a main electrical panel or load center 12 located in the interior of a building 14. In the prior art power inlet arrangement of FIG. 1, a manual power transfer panel 16 is mounted adjacent main panel 12, and is interconnected therewith via a series of wires enclosed by a conduit 18 extending between main panel 12 and transfer panel 16. Transfer panel 16 may illustratively be a panel such as that manufactured by Reliance Time Controls, Inc. of Racine, Wisconsin under the designation GEN/TRAN (e.g. Model 20216 or any other satisfactory model).

A power inlet box 20 is mounted to the wall of building 14, shown at 22. Power inlet box 20 includes an external housing including a series of walls such as 24, and a receptacle 26 mounted to a front wall of the housing. A cover 28 is mounted to the front wall of the housing via a hinge structure, and is movable between an open position as shown in FIG. 1 and a closed position in which cover 28 encloses receptacle 26 when not in use. A conduit 30 extends between inlet box 20 and a junction box 32, and a flexible cord 38 is attached at one end to junction box 32. At its opposite end, flexible cord 38 has a connector 42 engageable with a power inlet receptacle provided on transfer panel 16. Appropriate wiring and connections are contained within inlet box 20, conduit 30 and junction box 32 for providing an electrical path between inlet box 20 and transfer panel 16 when cord 38 is engaged with the inlet receptacle of transfer panel 16.

A power cord 44 extends between generator 10 and power inlet box 20. Cord 44 includes a plug 46 at one end, which is engageable with the power outlet of generator 10. Cord 44 further includes a connector 48 at the end opposite plug 46. Connector 48 is engageable with recessed power inlet 26 for transferring power generated by generator 10 to power inlet box 20, which is then supplied through the wiring in conduit 30, junction box 32, cord 38 and connector 42 to transfer panel 16, and from transfer panel 16 through the wiring in conduit 18 to main panel 12. In this manner, generator 10 functions to provide power to selected circuits of main panel 12 during a power outage. In this arrangement, it is necessary for the user to first connect cord 38 to the power input of transfer panel 16 utilizing connector 42, and to then exit the building, connect cord 44 between generator 10 and power inlet 20, and then commence operation of generator 10. This two-step procedure inevitably consumes a certain amount of time and inconvenience by first having to engage cord 38 with transfer panel 16 within building 14 and then exiting the building to carry out the various operations associated with connection and startup of generator 10.

FIG. 2 illustrates a power transfer arrangement in accordance with the invention for providing power from generator 10 to main electrical panel 12. In the power transfer arrangement of FIG. 2, power inlet box 20 and main electrical panel 12 have the same function and construction as in the prior art power transfer arrangement of FIG. 1.

In the power transfer arrangement of FIG. 2, a power transfer switching mechanism 50 is interposed between load center 12 and inlet box 20. Power transfer switching mechanism 50 includes a cabinet defining a pair of side walls 52, 54, a top wall 56 extending between the upper ends of side walls 52 and 54, a bottom wall 58 (FIG. 3) extending between and interconnecting the lower ends of side walls 52 and 54, a partial height front panel 60 and a rear panel 62 (FIG. 4). Walls 52–58, in combination with front panel 60 and rear panel 62, define an upper cavity 64 within which a series of circuit breakers or switches 66 are located.

Front panel 60 is bent rearwardly at its lower end to form an intermediate transverse wall 68 which defines the lower extent of upper cavity 64. A terminal compartment 70 is defined by intermediate transverse wall 68 in combination with bottom wall 58, the lower portions of side walls 52 and 54, and the lower portion of rear panel 62. Terminal compartment 70 is accessible through an opening below front panel 60. A cover 72 (FIG. 1) is sized so as to enclose the opening of terminal compartment 70. Cover 72 includes a pair of openings in alignment with openings formed in a pair of tabs 74 mounted to bottom wall 58, to enable cover 72 to be mounted to bottom wall 58 utilizing threaded fasteners which extend through the openings in cover 72 and into engagement with the openings in tabs 74. In this manner, cover 72 is selectively engaged with bottom wall 58 to provide access to terminal compartment 70, and is connected to bottom wall 58 so as to prevent access to terminal compartment 70.

Figure 3:
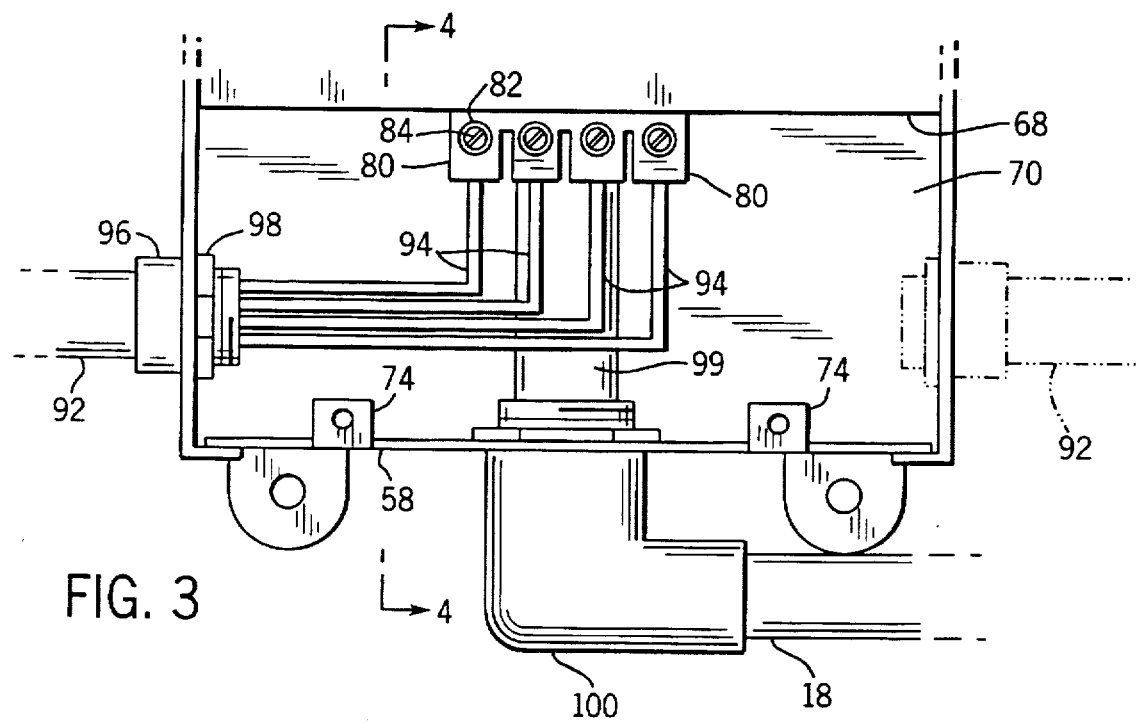
FIG. 3 is a partial front elevation view showing the bottom portion of the power transfer arrangement of FIG. 2 with the access cover removed.

A terminal assembly 76 is mounted to a vertical plate 78, which is mounted at its ends to intermediate transverse wall 68 to fix terminal assembly 76 in position relative to intermediate transverse wall 68. Terminal assembly 76 is of conventional construction, including a series of cylindrical receivers 80, each of which defines a downwardly facing opening. Each receiver 80 includes an outwardly extending cylindrical member 82 extending perpendicularly to receiver 80, defining a passage for receiving a threaded member, the head of which is shown at 84 (FIG. 3). Receivers 80 are accessible from, and in communication with, terminal compartment 70. Terminal assembly 76 further includes a series of upwardly opening cylindrical receivers 86, which are disposed within upper cavity 64. Each upper cylindrical receiver 86 includes a cylindrical member 88 which receives a threaded member (not shown).

Terminal assembly 76 may illustratively be a terminal assembly such as is available from Atech Corp. of Somerville, N.J., under its Model No. TSF/16, although it is understood that any other satisfactory terminal arrangement could be employed. In a terminal arrangement such as this, receivers 80 and 86 are formed of a molded plastic material integrally with cylindrical members 82 and 88. These components surround metal contact assemblies, with one of the contact assemblies being located in both a cylindrical receiver 80 and a cylindrical receiver 86. In this manner, an electrical connection to terminal assembly 76 is made by inserting a bare wire end into the open lower end of receiver 80 and tightening the threaded member utilizing its head 84, to establish an electrical connection with the wire via the metal contact enclosed within cylindrical receiver 80. A similar operation is employed to connect a wire end to the contact enclosed by the opposed cylindrical receiver 86, so as to establish a connection between the wires connected to the terminal assembly in this manner.

As shown in FIG. 4, a wire such as 90 is connected to each upper cylindrical receiver 86 at one end, and at its other end to one of the switches 66 enclosed within upper cavity 64, so as to establish an electrical connection between each of the upper contact members of terminal assembly 76 and one of switches 66. Referring to FIGS. 2 and 3, a conduit 92 extends between power inlet box 20 and switching mechanism 50. Conduit 92 encloses a series of power input wires 94 (FIG. 3), and extends through a knock-out opening formed in the lower portion of side wall 52 via a conventional nipple 96 and lock nut 98. As can be appreciated, an input wire conduit such as 92 could also be connected through a knock-out opening in side wall 54, as shown in phantom in FIG. 3, or in knock-out openings in bottom wall 58 or the lower portion of rear panel 62.

The ends of power input wires 94 are connected to terminal assembly 76 by placing the bare end of each wire 94 into one of receivers 80 and tightening the associated threaded member, as explained previously, to establish an electrical connection with a contact member enclosed by one of the cylindrical receivers 80. In this manner, input power is supplied from remote power inlet 20 to terminal assembly 76, which is subsequently transferred from terminal assembly 76 to wires 90 which extend between terminal assembly 76 and switches 66. This arrangement enables a person installing switching mechanism 50, such as an electrician or do-it-yourself homeowner, to establish a direct electrical connection between remote power inlet box 20 and switching mechanism 50, without the need for connecting a flexible cord to a power input receptacle as in the prior art. In this manner, the only necessary operation in connection with switching mechanism 50 to enable transfer of power from generator 10 to load center 12 is to place switches 66 in the appropriate position so as to transfer power to load center 12 as desired in response to operation of generator 10.

Output wires from switches 66 extend through terminal compartment 70 and are connected to an elbow fitting 100 secured to bottom wall 58, for routing through conduit 18 to load center 12.

It can thus be appreciated that the provision of terminal compartment 70 provides an extremely convenient and simple arrangement for establishing a direct, hardwired connection between power inlet box 20 and power transfer switching mechanism 50. The user or installer simply must remove cover 72 to gain access to terminal compartment 70 for connecting or disengaging power input wires 94 to or from terminal assembly 76. Terminal compartment 70 also provides a convenient cavity to facilitate pulling of wires through conduit 92. Once the user has completed the necessary operations in terminal compartment 70, the user simply replaces cover 72 as described previously, to thereby prevent access to terminal compartment 70.

Various alternatives and embodiments are contemplated as being within the cope of the following claims particularly pointing out and distinctly claiming the subject matter regarded as the invention.

We claim:

1. A power transfer arrangement for supplying power from a generator to an electrical system of a building, comprising:

a power inlet arrangement separate from the generator and adapted for interconnection with the generator for receiving power therefrom;

a power transfer device, separate from the power inlet arrangement, adapted for interconnection with the building electrical system and including a set of power input terminals electrically interconnected with at least one set of switches; and a non-plug type electrical connection extending between and electrically connecting the power inlet arrangement with the set of power input terminals for providing an electrical connection between the power inlet arrangement and the power transfer device.

2. The power transfer arrangement of claim 1, wherein the power transfer device includes a cabinet, and wherein the set of power input terminals are mounted within a power input terminal compartment associated with the cabinet.

3. The power transfer arrangement of claim 2, wherein the power transfer device includes a plurality of switches for controlling the supply of power from the power transfer device to the building electrical system, wherein each of the plurality of switches are electrically connected to the power input terminal arrangement.

4. The power transfer arrangement of claim 2, wherein the power inlet arrangement comprises a remote power inlet box, and wherein the non-plug type electrical connection between the power inlet arrangement and the power transfer device comprises a set of power input wires having a first end connected to the remote power inlet box and a second end connected to the set of power input terminals.

5. The power transfer arrangement of claim 4, wherein the power input wires extend through a conduit having an end fixed to the cabinet such that a passage defined by the conduit, through which the power input wires extend, is in communication with the power input terminal compartment.

6. The power transfer arrangement of claim 2, wherein the cabinet defines an opening providing access to the power input terminal compartment, and further comprising a removable cover positionable over the opening and removably engageable with the cabinet for selectively preventing access to the power input terminal compartment.

7. The power transfer arrangement of claim 6, wherein the non-plug type electrical connection between the power input arrangement and the power transfer device comprises a set of power input wires extending through a conduit, wherein the conduit is fixed to a wall of the cabinet and defines a passage in communication with the power input terminal compartment, and wherein the power input wires extend from the conduit through the power input terminal compartment for connection to the set of power input terminals.

8. In a standby power supply system including a generator, a power transfer device interconnected with an electrical system of a building and including at least one switch, and a power inlet separate and remote from the power transfer device and separate from the generator, wherein the power inlet is adapted for interconnection with the generator, the improvement comprising a set of power input terminals provided on the power transfer device and interconnected with the at least one switch for establishing a non-plug type electrical connection between the power inlet and the power transfer device.

9. The improvement of claim 8, wherein the power transfer device comprises a cabinet and includes a plurality of switches mounted to the cabinet, and wherein the power input terminals are located within a power input terminal compartment defined by the cabinet at a location spaced from the plurality of switches, wherein the power input terminals are electrically connected to the switches for providing power to the switches.

10. The improvement of claim 9, wherein the non-plug type electrical connection between the power inlet and the power transfer device comprises a set of power input wires extending through an opening associated with the power input terminal compartment and through the power input terminal compartment for connection to the power input terminals.

11. The improvement of claim 10, wherein the cabinet defines an opening providing access to the power input terminal compartment, and further comprising a cover removably engageable with the cabinet over the opening for selectively providing access to the power input terminal compartment.

12. In a power transfer device adapted for interconnection with an electrical system of a building for supplying power to the building electrical system from a power source separate from the power transfer device, wherein the power transfer device includes a cabinet, a set of switches mounted to the cabinet, and a first set of wires for connecting the switches to an electrical distribution panel associated with the building electrical system, the improvement comprising a terminal compartment associated with the cabinet and a set of power input terminals located within the terminal compartment, wherein the power input terminals are electrically connected to the switches via a second set of wires and are adapted for a non-plug type electrical connection to the power source via a set of power input wires for supplying power from the power source to the power transfer device.

13. The improvement of claim 12, wherein the cabinet defines an opening providing access to the terminal compartment, and further comprising a movable cover positionable over the opening for selectively closing the opening for preventing access to the terminal compartment.

14. The improvement of claim 13, wherein the power input wires extend through a conduit mounted to a wall of the cabinet which in part defines the terminal compartment.

15. The improvement of claim 14, wherein the terminals are mounted to a plate member mounted within an internal cavity defined by the cabinet, wherein the plate member functions to at least in part define the terminal compartment.

16. The improvement of claim 15, wherein the cabinet includes a front wall to which the set of switches are mounted, wherein the opening providing access to the terminal compartment is defined in part by an edge of the front wall.

17. The improvement of claim 16, wherein the terminal compartment is defined by the plate member in combination with a pair of spaced side walls and an end wall defined by the cabinet.

18. A method of connecting power input wiring to a power transfer device in a standby power supply system for supplying power to an electrical system of a building from a generator, wherein the power input wiring extends from and is interconnected with a power inlet separate from the generator and wherein the power transfer device is interconnected with the building electrical system, the method comprising connecting the power input wiring in a non-plug type fashion to a set of power input terminals associated with the power transfer device, wherein the set of terminals is interconnected with a set of switches associated with the power transfer device to establish an electrical connection between the power inlet and the power transfer device.

19. In a power transfer panel for use in supplying power from a generator to an electrical system of a building, wherein the building electrical system includes an electrical panel and the power transfer panel is separate from the electrical panel and electrically connected to the electrical panel, the improvement comprising an input terminal arrangement associated with the power transfer panel and interconnected with a set of switches provided on the power transfer panel, wherein the input terminal arrangement is adapted for a non-plug type electrical connection to power input wiring from a power inlet separate from the generator for providing power to the input terminal arrangement from the generator through the power inlet.

* * * * *